June 15, 1926.

G. E. HAGEN 1,588,794

VALVE

Filed Oct. 15, 1924

INVENTOR.
GEORGE.E.HAGEN.
BY Johnstonhaugh Co.
ATT'YS.

Patented June 15, 1926.

1,588,794

UNITED STATES PATENT OFFICE.

GEORGE EDWARD HAGEN, OF HALIFAX, NOVA SCOTIA, CANADA.

VALVE.

Application filed October 15, 1924. Serial No. 743,827.

This invention relates to improvements in valves and more particularly to valves for radiators or the like wherein the closure is of the ported sleeve type. Heretofore it has been customary to limit the travel of the valve closure by providing the valves with stationary stops. The feature, however, of my improved valve is the adjustment, the bonnet of the valve being grooved in combination with a stop integral with the valve stem to regulate the distance the valve cylinder can travel, the adjustment so provided being so flexible that the valve can be set to the smallest fraction while in operation.

Further objects are to so improve the several parts that they will more satisfactorily perform the various functions required of them.

With the foregoing and other objects in view, the invention consists essentially in the matters hereinafter set forth and more particularly described in the present specification and illustrated in the accompanying drawings.

In the drawings, in which like characters of reference indicate corresponding parts in each figure, Figure 1 is a vertical section through the valve.

Figure 5:
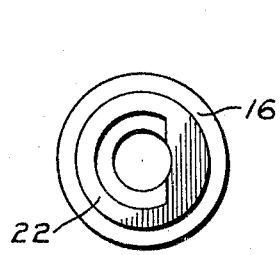
Figure 5 is a view of the underside of the bushing, showing the groove therein.
Figure 4:
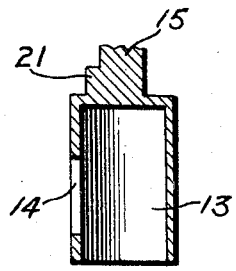
Figure 4 is a sectional detail of the hollow ported sleeve.
Figure 3:
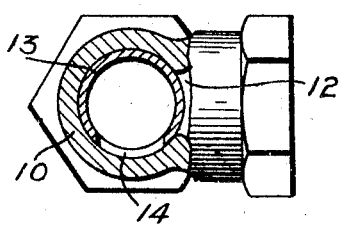
Figure 3 is a section on the line 3—3 of Figure 1.
Figure 2:
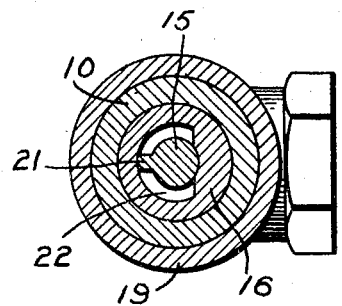
Figure 2 is a section on the line 2—2 of Figure 1.
Figure 1:
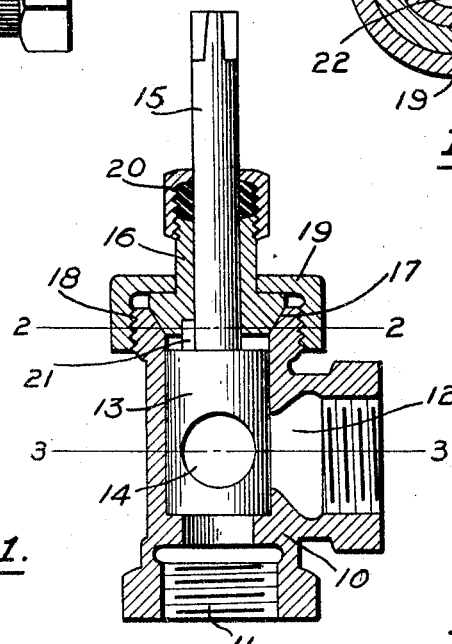

In the drawings as here shown a substantially cylindrical casing 10 has an inlet nipple 11 fitted for connection with the source of steam, hot air or hot water supply and a lateral outlet 12 tapped for a hot water or steam pipe or otherwise. Within the casing 10 a hollow ported sleeve closure 13 is journaled so that the port 14 thereof may be brought to register with the outlet 12 by manipulation of the sleeve.

The closure member 13 is provided with a stem 15 formed integral with the upper end thereof, the stem 15 being in turn provided with a bushing 16 adapted to rotatably fit into a seat 17 in the top of the casing 10, the outside of the casing being screw-threaded at 18 to engage with a bonnet or cap 19 adapted to fit over the bushing and when screwed home to retain the bushing fixedly in position. The upper end of this bonnet is provided with a suitable packing gland 20.

Coming now to the essential feature of my invention, 21 is a stop formed integral on the side of the stem 15 and designed to engage with a semi-circular groove 22 formed in the bottom of the bushing 16 and more particularly illustrated in Figure 5.

From the foregoing it will be seen that the groove 22 in combination with the stop 21 will regulate the distance the sleeve 13 can travel.

To operate the valve it is only necesary to loosen the bonnet 19 on its thread, then turn the stem 15, which will rotate the bushing 16 when the lug or stop 21 engages with either end of the groove 22, turning stem 15 in either direction until the desired amount of valve opening is attained, as may be indicated by suitable markings on the valve bonnet. Then re-tighten the bonnet 19, leaving the valve set ready to operate.

As many changes could be made in the above construction and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:

A valve comprising a main casing having an inlet opening at one end and a seat formed at the other end, a lateral outlet opening between the ends, a ported sleeve valve rotatable in axial alignment with the inlet opening, a stem for the valve, a bushing surrounding the stem and engaging said seat, a screw-threaded bonnet adapted to fit over said bushing and to engage with the casing, a groove in the base of said bushing having shoulders at opposite ends thereof and a stop member formed integral with the stem, adapted to engage with said shoulders, a packing gland for the stem, screw-threaded to engage with the bushing.

In witness whereof I have hereunto set my hand.

GEORGE EDWARD HAGEN.